(12) United States Patent
Esprey et al.

(10) Patent No.: US 11,130,510 B2
(45) Date of Patent: Sep. 28, 2021

(54) DISTRIBUTED FIBRE OPTIC SENSING FOR IN-TRAIN FORCES MONITORING

(71) Applicant: OPTASENSE HOLDINGS LIMITED, Farnborough (GB)

(72) Inventors: Chris Esprey, Farnborough (GB); Alastair Godfrey, Farnborough (GB)

(73) Assignee: OPTASENSE HOLDINGS LIMITED, Hampshire (GB)

( * ) Notice: Subject to any disclaimer, the term of this patent is extended or adjusted under 35 U.S.C. 154(b) by 499 days.

(21) Appl. No.: 16/313,209

(22) PCT Filed: Jun. 19, 2017

(86) PCT No.: PCT/GB2017/051791
§ 371 (c)(1),
(2) Date: Dec. 26, 2018

(87) PCT Pub. No.: WO2018/002582
PCT Pub. Date: Jan. 4, 2018

(65) Prior Publication Data
US 2019/0225250 A1  Jul. 25, 2019

(30) Foreign Application Priority Data
Jun. 29, 2016  (GB) ...................... 1611326

(51) Int. Cl.
*B61L 1/06* (2006.01)
*B61L 27/00* (2006.01)
(Continued)

(52) U.S. Cl.
CPC ............. *B61L 27/0094* (2013.01); *B61L 1/06* (2013.01); *B61L 1/20* (2013.01); *B61L 23/04* (2013.01); *G01H 9/004* (2013.01)

(58) Field of Classification Search
CPC ... G01H 9/004; B61L 1/06; B61L 1/14; B61L 1/166; B61L 27/0094
See application file for complete search history.

(56) References Cited

U.S. PATENT DOCUMENTS 5,330,136 A * 7/1994 Colbaugh ................. B61L 1/06
                                                                246/122 R
5,462,244 A * 10/1995 Van Der Hoek ......... B61L 1/06
                                                                246/122 R
(Continued)

FOREIGN PATENT DOCUMENTS

CA        1065039       10/1979
CN       101900708     12/2010
(Continued)

OTHER PUBLICATIONS

L. Sliwezynski and R Krehlik, "Measurement of acoustic noise in field-deployed fiber optic cables", IEEE (2014).
(Continued)

*Primary Examiner* — Zachary L Kuhfuss
(74) *Attorney, Agent, or Firm* — McDonnell Boehnen Hulbert & Berghoff LLP

(57) ABSTRACT

This application relates to methods and apparatus for monitoring data obtained as a train (202) travels on along a rail track (201) to detect the occurrence and/or severity of any significant in-train forces, such as may be caused by heavy braking or excessive acceleration. The method involves taking a first data set corresponding to measurement signals from a plurality of channels of at least one fibre optic distributed acoustic sensor (202) having a sensing fibre (101) deployed to monitor at least part of the rail track. The first data set corresponds to measurement signals acquired as the train passes along the rail track. The method involves analysing the measurement signals to detect a first charac- (Continued)

teristic signature (402) which consists of a sequence of acoustic transients that appear to propagate rearwards along the train.

21 Claims, 4 Drawing Sheets

(51) Int. Cl.
   *B61L 23/04* (2006.01)
   *B61L 1/20* (2006.01)
   *G01H 9/00* (2006.01)

(56) References Cited

U.S. PATENT DOCUMENTS

| | | | |
|---|---|---|---|
| 8,861,973 B2* | 10/2014 | Tam | B61L 1/166 |
| | | | 398/140 |
| 9,561,812 B2* | 2/2017 | Godfrey | G01M 5/0091 |
| 10,377,397 B2* | 8/2019 | Kelley | G01H 9/004 |
| 2010/0213321 A1 | 8/2010 | Kane et al. | |
| 2012/0217351 A1* | 8/2012 | Chadwick | B61L 29/32 |
| | | | 246/169 R |
| 2013/0151203 A1* | 6/2013 | McEwen-King | G06F 17/00 |
| | | | 702/189 |
| 2015/0013465 A1* | 1/2015 | Godfrey | G01M 5/0091 |
| | | | 73/655 |
| 2016/0334543 A1* | 11/2016 | Nagrodsky | B61L 1/06 |
| 2018/0267201 A1* | 9/2018 | Lewis | G01D 5/268 |
| 2020/0172130 A1* | 6/2020 | Esprey | G01H 9/006 |
| 2020/0339167 A1* | 10/2020 | Liu | G01M 5/0091 |
| 2021/0140122 A1* | 5/2021 | Wilczek | B61L 1/06 |

FOREIGN PATENT DOCUMENTS

| | | |
|---|---|---|
| CN | 102756748 | 10/2012 |
| CN | 104203713 | 12/2014 |
| DE | 102012217627 | 3/2014 |
| GB | 2 442 745 | 4/2008 |
| WO | WO 2012/137021 | 10/2012 |
| WO | WO 2012/137022 | 10/2012 |
| WO | WO 2013/045941 | 4/2013 |
| WO | WO 2013/124681 | 8/2013 |
| WO | WO 2016/027072 | 2/2016 |

OTHER PUBLICATIONS

National Intellectual Property Administration, P.R. China, First Office Action dated Sep. 18, 2020, issued in connection with Chinese Patent Application No. 201780053391.5, filed on Jun. 19, 2017, 14 pages (English translation included).

* cited by examiner

DISTRIBUTED FIBRE OPTIC SENSING FOR IN-TRAIN FORCES MONITORING

FIELD OF THE INVENTION

This application relates to methods and apparatus for rail monitoring using distributed fibre optic sensing, especially distributed acoustic sensing, and in particular to methods and apparatus for monitoring of rail vehicles moving on the network.

BACKGROUND OF THE INVENTION

Fibre optic distributed acoustic sensing (DAS) is a known type of sensing where an optical fibre is deployed as a sensing fibre and repeatedly interrogated with electromagnetic radiation to provide sensing of acoustic activity along its length. Typically one or more input pulses of radiation are launched into the optical fibre. By analysing the radiation backscattered from within the fibre, the fibre can effectively be divided into a plurality of discrete sensing portions which may be (but do not have to be) contiguous. Within each discrete sensing portion mechanical disturbances of the fibre, for instance, strains due to incident acoustic waves, cause a variation in the properties of the radiation which is backscattered from that portion. This variation can be detected and analysed and used to give a measure of the disturbance of the fibre at that sensing portion. Thus the DAS sensor effectively acts as a linear sensing array of acoustic sensing portions of optical fibre. The length of the sensing portions of fibre is determined by the characteristics of the interrogating radiation and the processing applied to the backscatter signals but typically sensing portions of the order of a few meters to a few tens of meters or so may be used.

DAS has been used in a number of applications such as perimeter security and monitoring of linear assets such as pipelines. One particular application where it has been proposed that DAS sensors may be employed is in monitoring of rail networks, for example monitoring trains moving on the rail network.

For monitoring of rail networks, sensing fibres can be deployed to run generally along the path of one or more rail tracks of the rail network. Movement of a train on such a rail track adjacent a DAS sensing fibre will generate acoustic signals/vibrations that can be used to track the vehicle as it moves, providing real time positional information to a resolution of a few tens of metres continuously along the entire length of the monitored section.

DAS has several advantages for such rail network monitoring. DAS can be applied to provide many sensing channels over a long length of fibre, for example DAS can be applied on fibre lengths of up to 40 km or more with contiguous sensing channels of the order of 10 m long. Thus a long stretch of the rail network can be monitored using a single DAS sensor. For lengths of more than 40 km or so several DAS sensors units can be deployed at various intervals to provide continuous monitoring of any desired length of the transport network.

The sensing fibre may be standard telecoms fibre and thus is relatively cheap. The fibre may be simply buried alongside the transport networks, e.g. along the sides or underneath tracks or roads in a narrow channel and is relatively easy install. The optical fibre can be encased in a protective casing, i.e. in a cable, and can survive for a long time with no maintenance. Thus installation and maintenance costs are low. In many transport networks there may already be optic fibre deployed along at least the major routes and such existing communications infrastructure may comprise redundant optical fibres that can be used for DAS.

The optical fibre is interrogated by optical pulses generated by the interrogator unit and thus power is only needed for the interrogator units.

In a rail network setting a DAS system thus provides the ability to achieve both a desired spatial resolution and scope of coverage that would be very difficult and costly to achieve using other sensing technologies and which allows for real-time monitoring and/or control of the transport network.

SUMMARY OF THE INVENTION

Embodiments of the present invention thus relate to methods and apparatus for distributed fibre optic sensing for rail monitoring and in particular to methods and apparatus for monitoring the acoustic signals produced by a moving rail vehicle to provide additional information regarding the rail vehicle.

Thus according to one aspect of the present invention there is provided a method of detecting in-train forces comprising:
  taking a first data set corresponding to measurement signals from a plurality of channels of at least one fibre optic distributed acoustic sensor having a sensing fibre deployed to monitor at least part of a rail track, wherein the first data set corresponds to measurement signals acquired as a train passed along the rail track; and
  analysing said measurement signals to detect a first characteristic signature, said first characteristic signature comprising a sequence of acoustic transients that appear to propagate rearwards along the train.

As will be described in more detail below under relatively heavy braking or acceleration relatively significant forces may be generated in the couplings between cars of the train. Acoustic transients may be generated as the couplings between cars are extended or compressed by acceleration or deceleration. As the train accelerates or decelerates these in-train forces will propagate throughout the length of the train leading to the first characteristic signature. An occurrence of the first characteristics signature may thus be identified as occurrence of significant in-train forces. Detection of such a characteristics signature can be used as a detection that significant in-train forces have been experienced.

The method may also involve estimating the magnitude of the in-train forces based on the intensity of the acoustic transients. The method may involve determining the rate of change of magnitude of the in-train forces as they propagate through the train.

The sequence of acoustic transients may be analysed to determine information about the propagation of in-train forces throughout the train. For example an estimate of impact velocity between cars of the trains at at least one location along the train may be determined.

Analysing the measurement signals may comprise identifying acoustic signals associated with the train for each of a plurality of channels. Thus for various channels the signals in a time window associated with the train passing the relevant sensing portion may be determined. Identifying acoustic signals associated with the train may comprise processing the signals in a first frequency band. The first frequency band may be a relatively low frequency band associated with general noise generated by a moving train. The acoustic signals associated with the train may then be analysed to detect transients.

Analysing the acoustic signals associated with the train to detect transients may, in some examples, comprise analysing the acoustic signals in at least one defined frequency band. The at least one defined frequency band may have a cut-off frequency that is higher than that of the first frequency band. Inn some examples analysing the acoustic signals associated with the train to detect transients may comprise analysing the acoustic signals in at least a second frequency band and a third frequency band, wherein the third frequency band has a lower frequency cut-off that is higher than the second frequency band. The method may involve identifying a transient in the second frequency band and qualifying the transient in the third frequency band.

Detecting the first characteristic signature may comprise determining the presence of any clustering of transients that corresponds to the characteristic signature. The transients may be grouped in clusters in space and time within predetermined tolerances based on a model of in-train forces. The method may involve applying a curve fit to the cluster.

In some instance the method may be performed on the first data set which has been previously acquired, possibly by some party, and stored in some accessible location.

Thus the method may involve analysing historic data or live or recent data supplied by another entity. In some instance however the method may also involve performing distributed acoustic sensing on the sensing fibre as a train travels on the rail track to generate the first data set. The method may comprise communicating any detection of the first characteristic signature to the train. Thus for real-time detection, any occurrence of significant in-train forces may be communicated to the train, for example to allow corrective action to be taken to reduce the severity of the in-train forces being experienced. On detection of the first characteristic signature an alert may be generated for the train driver and/or one aspect of the train movement control may be automatically adjusted. Additionally or alternatively information about the in-train forces may be relayed to a control centre to modify some aspect of rail network control, e.g. a speed limit or the like.

Also provided is an apparatus for detecting in-train forces comprising:
a processor configured to:
  take a first data set corresponding to measurement signals from a plurality of channels of at least one fibre optic distributed acoustic sensor having a sensing fibre deployed to monitor at least part of a rail track, wherein the first data set corresponds to measurement signals acquired as a train passed along the rail track; and
  analyse said measurement signals to detect a first characteristic signature, said first characteristic signature comprising a sequence of acoustic transients that appear to propagate rearwards along the train.

The apparatus may be configured to implement the method in any of the variant described herein.

Also provided is a rail monitoring system comprising:
a sensing optical fibre deployed to run along at least partly along the path of a rail track;
an interrogator unit configured to perform distributed acoustic sensing on the sensing optical fibre to generate measurement signals from a plurality of channels of the sensing optical fibre; and
an apparatus for detecting in-train forces as described above configured to operate on a first data set of measurement signals acquired by said interrogator unit as a train passed along the rail track.

Aspects also relate to software code on a non-transitory storage medium, said code comprising computer readable instructions for instructing a suitable computing apparatus to perform the method of any of the variant described herein. The storage medium may be any suitable non-volatile memory such a CD-ROM, memory stick, fals memory or memory module of a computing device.

DESCRIPTION OF THE DRAWINGS

The invention will now be described by way of example only with respect to the accompanying figures, of which.

DESCRIPTION OF THE INVENTION

Embodiments of the present disclosure relate to monitoring of rail vehicles moving on a rail network using distributed fibre optic sensing, and in particular fibre optic distributed acoustic sensing (DAS). In particular embodiments of the invention relate to monitoring for instances of large forces experienced by the rail vehicle in use and, in some embodiments, to estimating the severity of such forces. Embodiments analyse the data from a DAS sensor to detect a signal characteristic of significant in-train forces, which may be a sequence of acoustic transients that appear to propagate backwards along the train as will be described in more detail below.

As mentioned previously DAS is a known technique where an optical fibre, referred to herein as a sensing fibre, is deployed in an area of interest and interrogated with optical radiation so as to determine information about environmental disturbances affecting various sensing portions of the optical fibre.

Figure 1:
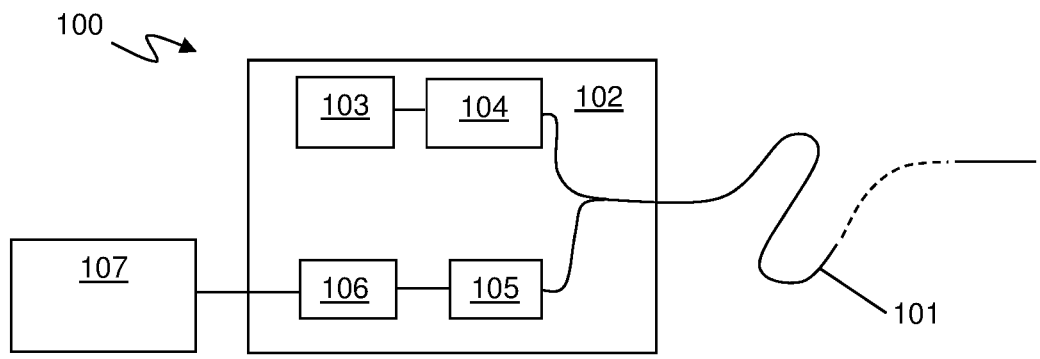
FIG. 1 illustrates a fibre optic distributed acoustic sensor.

FIG. 1 illustrates one example of a DAS sensor 100. The DAS sensor comprises an optical fibre 101 disposed as a sensing fibre and optically coupled at one end to an interrogator unit 102, either directly through some suitable connection (which may be a removable connection) or in some instances indirectly, e.g. via an intermediate fibre or the like. The sensing fibre 101 can be many kilometres in length and can be, for instance 40 km or more in length. The sensing fibre may be a standard, unmodified single mode optical fibre such as is routinely used in telecommunications applications without the need for deliberately introduced reflection sites such a fibre Bragg grating or the like. The ability to use an unmodified length of standard optical fibre to provide sensing means that low cost readily available fibre may be used. However in some embodiments the sensing fibre may comprise an optical fibre which has been fabricated or arranged to be especially sensitive to incident vibrations. Typically the sensing optical fibre will form part of a fibre optic cable structure, possibly as one of a bundle of optical fibres within the cable and optionally with other components such as strengthening or armouring elements or elements arranged to tailor the response to transverse strains. As the sensing fibre is typically relatively inexpensive the sensing fibre may be deployed in a location in a relatively permanent fashion as the costs of leaving the fibre in situ are not significant. For example at least parts of the sensing fibre may be buried in the ground alongside the rail track.

In operation the interrogator unit 102 launches coherent interrogating electromagnetic radiation, which may for example comprise a series of optical pulses having a selected frequency pattern, into the sensing fibre. The optical pulses may have a frequency pattern as described in patent publications GB2,442,745 or WO2012/137022, the contents of which are hereby incorporated by reference thereto, although DAS sensors using other forms of pulsed interrogating radiation or a continuously modulated wave are also known and may be used. Note that as used herein the term "optical" is not restricted to the visible spectrum and optical radiation includes infrared radiation and ultraviolet radiation. The interrogator unit 102 therefore comprises at least one laser 103 and at least one optical modulator 104 for producing the interrogating radiation, which in one embodiment may comprise a plurality of optical pulses separated by a known optical frequency difference.

As described in GB2,442,745 or WO2012/137022 the phenomenon of Rayleigh backscattering results in some fraction of the light input into the fibre being scattered back to the interrogator unit, where it is detected and processed to provide a measurement signal which is representative of disturbances acting on the fibre. As the interrogating radiation is coherent the Rayleigh backscatter received back at the interrogator at any instant is an interference signal of the backscatter generated within the fibre from a particular position in the fibre. It will be noted this Rayleigh backscatter is generated by interaction between the interrogating radiation and inherent scattering sites present within the optical fibre. Thus the sensing function may be effectively distributed throughout the whole sensing fibre (although the returns are processed in time bins to provide results from individual sensing portions of the fibre). Such a sensor is therefore referred to as a distributed sensor or intrinsic sensor as the sensing is distributed throughout and intrinsic to the fibre itself. This is in contrast to sensors that used fibres having fibre Bragg gratings (FBGs) or similar deliberately introduced extrinsic reflection sites where the sensing function is provided in defined areas, typically as a point sensor.

The distribution of scattering sites throughout an optical fibre is effectively random and thus the backscatter interference signal includes a component that varies randomly along the length of the sensing fibre. However in general, in the absence of any environmental stimulus acting on the sensing fibre the characteristics of the backscatter from a given sensing portion of the fibre will be the same for successive interrogations (assuming the characteristics of the interrogating radiation do not change). However an environmental stimulus such as an incident acoustic wave that creates a dynamic strain on a section of fibre will result in a change in the effective optical path length for that sensing portion with a resultant variation in the properties of the backscatter interference signal from that section. This variation can be detected and used to indicate the extent of disturbances acting on the sensing fibre.

The interrogator unit 102 thus also comprises at least one photodetector 105 arranged to detect radiation which is Rayleigh backscattered from the intrinsic scattering sites within the fibre 101. It should be noted however that whilst a Rayleigh backscatter DAS sensor is very useful in embodiments of the present invention, systems based on Brillouin or Raman scattering are also known and could be used in some embodiments of the invention.

The signal from the photodetector is processed by signal processor 106 in time bins corresponding to the round trip travel time to defined sensing portions of the sensing fibre. The signals in each of the time bins are processed to detect variation in the backscatter properties and generate a measurement signal for each sensing portion.

In some examples the signal processor demodulates the returned signal based on the frequency difference between the optical pulses of interrogating radiation launched into the sensing fibre. The interrogator may operate as described in GB2,442,745 or WO2012/137022 for example or as described in WO2012/137021. In some embodiments the signal processor may also apply a phase unwrap algorithm.

The phase of a measurement signal may be derived from the backscattered light from various sections of the optical fibre. Any changes in the effective optical path length within a given section of fibre, such as would be due to incident pressure waves causing strain on the fibre will lead to a change in the measured phase between repeated interrogations. Thus dynamic changes acting on the fibre can therefore be detected in each of a plurality of sensing portions of the optical fibre. The magnitude of the change in phase is related to the effective change in optical path length and hence indicative of the strain on that sensing portion of the sensing fibre.

The form of the optical input and the method of detection allow a single continuous optical fibre to be spatially resolved into discrete longitudinal sensing portions. That is, the acoustic signal sensed at one sensing portion can be provided substantially independently of the sensed signal at an adjacent portion. The spatial resolution of the sensing portions of optical fibre may, for example, be approximately 10 m, which for a continuous length of fibre of the order of 40 km say provides 4000 independent acoustic channels or so deployed along the 40 km of fibre. More channels could be arranged on a fibre with a different channel width.

Note that term "acoustic" shall mean any type of pressure wave or mechanical disturbance that may result in a change of strain on an optical fibre and for the avoidance of doubt the term acoustic be taken to include ultrasonic and subsonic waves as well as seismic waves or other induced vibrations. As used in this specification the term "distributed acoustic sensing" or "DAS" will be taken to mean sensing by optically interrogating an optical fibre to provide a plurality of discrete acoustic sensing portions distributed longitudinally along the fibre and the term "distributed acoustic sensor" shall be interpreted accordingly.

The output from the interrogator unit 102 may thus be a measurement signal for each sensing portion of the relevant sensing fibre 101 which is indicative of the acoustic signals or dynamic strains acting on that sensing portion. The individual sensing portions may also be referred to as channels of the DAS sensor. The output of the interrogator unit 102 may be passed to a data processor 107 which may be configured to analyse the measurement signals for the various channels. The data processor 107 may be co-located with the interrogator unit 102 or remote therefrom.

Figure 2:
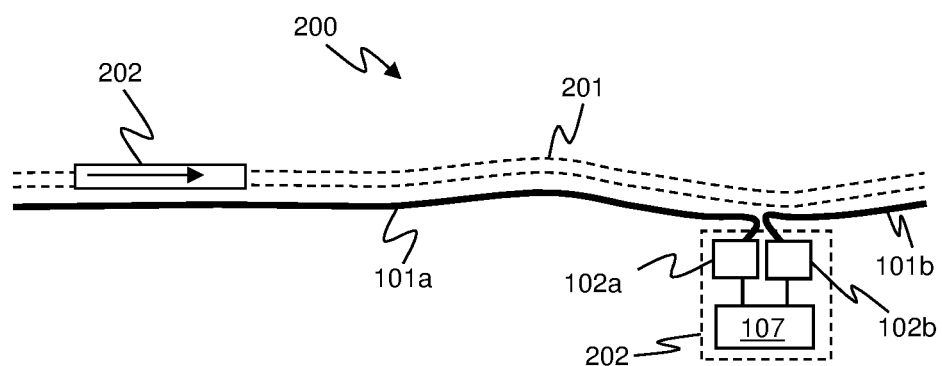
FIG. 2 illustrates distributed acoustic sensing (DAS) applied to monitoring a rail network.

For monitoring a rail network one or more sensing fibres 101 may be deployed to run along the path of parts of the rail network. FIG. 2 illustrates a DAS sensor apparatus 200 for monitoring a rail network. Note that as used herein a reference to monitoring a rail network shall be taken to mean monitoring at least part of a rail network, i.e. at least part of one or more rail tracks of the rail network. FIG. 2 illustrates a section of rail track 201 along which a train 202 may travel. FIG. 2 illustrates that the sensing fibres 101a and 101b are deployed so as to run generally alongside the track being monitored and at a relatively constant separation from the track such that the fibre is locally parallel to the track. This may be a convenient arrangement as the sensing portions of the sensing fibre 101 may be directly mapped to corresponding portions of the rail track 201. The sensing fibre may be deployed along the track in any convenient manner and may for instance be buried alongside the track, either directly in the ground or under the track ballast or in some suitable conduit. In other embodiments at least part of the sensing fibre may be coupled to the rail itself. In some instances however, especially if using optical fibres that were originally installed for a purpose other than DAS, the optical fibre may, at certain locations, not run parallel to the track and/or there may at some point be loops of optical fibre or part of the optical fibre may divert away from the track. In such a case it may be necessary to calibrate the position of the relevant sensing portions of the fibre relevant to the track. There are various ways this can be done as would be known to one skilled in the art of DAS sensing. The individual channels of the DAS sensor may thus be mapped to sections of the track which may have different lengths to one another so that a train moving at constant speed along the track would appear to move linearly across the channels of the DAS sensor.

In the example illustrated in FIG. 2 part of the rail track 201 is monitored by at least part of a first sensing fibre 101a and another part of the rail track 201 is monitored by at least part of a second sensing fibre 101b. The sensing fibres 101a and 101b may be arranged to provide relatively continuous monitoring of a relatively long section of the track 201. Each of the sensing fibres is connected to a respective DAS interrogator unit 102a and 102b, although in some arrangements a single DAS interrogator unit could be multiplexed between different sensing fibres in a time division fashion. In the example illustrated in FIG. 2 the interrogator units 102a and 102b are arranged as part of a sensor station 202 with the sensing fibres 101a and 101b extending in opposite directions along the track 201. This may provide sensing coverage of up to about 80 km of track or more from a single sensor station. A data processor 107 may be located at the sensor station to process the data from the interrogator units 102a and 102b. It will be appreciated that FIG. 2 illustrates just one example however and various different arrangements may be implemented depending on the particular rail network being monitored.

In use each DAS sensor may be operated to monitor the rail network, e.g. interrogator unit 102a interrogates the relevant sensing fibre 101a to provide DAS sensing. Movement of the train 220 along the track 201 will generate various dynamic strains, e.g. acoustic signals, that will propagate to the sensing fibre and be detected by the DAS sensor.

The acoustic signals detected by any given channel of a DAS sensor will depend on the stimulus giving rise to the acoustic signal and the path by which the acoustic signal travels to the sensing fibre. For monitoring a train moving on a rail network the train moving on the rail track acts as a moving acoustic source and the acoustic signals reaching any given sensing portion will depend on the characteristics of the train, the track on which it is moving and the environment surrounding the relevant sensing portion.

Rail vehicles such as trains typically comprise a number of different cars that are coupled together, for example via a buffer and chain-coupler or a knuckle coupler such as the Janney coupler. In many instances, especially for freight transport, there may be a large number of cars joined together.

When a train accelerates or decelerates the forces are transferred along the train via the couplings. In long trains a problem can arise when braking in that the braking control signal from the locomotive control can take some time to propagate backwards through the train so as to activate the brakes of each car. In some instances for long trains, e.g. of the order of a kilometre or greater in length, the braking control signal could take of the order of a few seconds to reach the end cars. This delay in braking can result in the cars nearer the front of the train starting to brake before the cars nearer to the back of the train. This can result in the rearward cars running into the forward cars which can produce large forces in the couplings, e.g. the coupler and/or buffers.

Large forces can likewise be produced on acceleration of the train. With excessive acceleration the slack in the couplings may be aggressively reduced, resulting in a relatively large force as the coupling reaches its fullest extent. This again results in a delayed jerking acceleration of each car in turn progressing backwards throughout the train.

Excessive forces in the buffers and couplers can contribute significantly to the degradation of the rolling stock. Repeated large forces of this type may thus degrade the coupling more quickly than otherwise would be the case, resulting in increased maintenance costs/downtime for inspection, repair and/or replacement. There is also the potential for catastrophic failure of the couplings, causing decoupling of carriages and even derailment.

Embodiments of the present invention relates to methods and apparatus for monitoring for the occurrence of such in-train forces and/or to estimating the extent or severity of such forces.

It has been appreciated by the present inventors that in-train forces caused by relatively high acceleration or deceleration of a train, or parts of a train, may create identifiable acoustic transients in the acoustic signals detected by a DAS system as a train travels along a track.

Figure 3A:
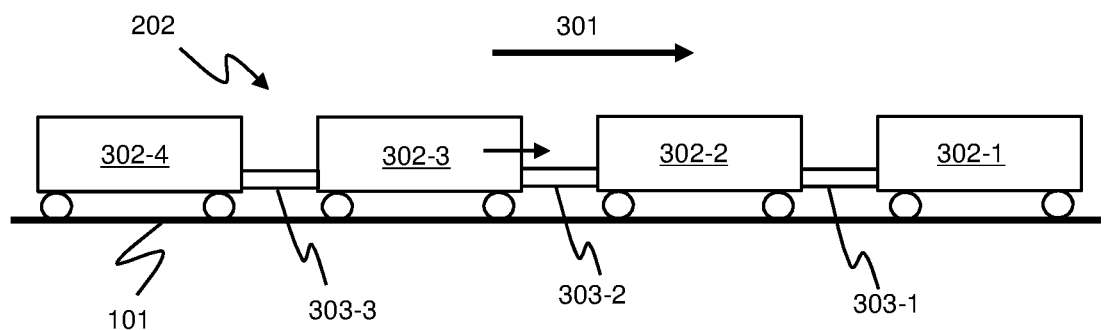
FIGS. 3a to 3c illustrate the generation of a sequence of acoustic transients as a train decelerates.
Figure 3B:
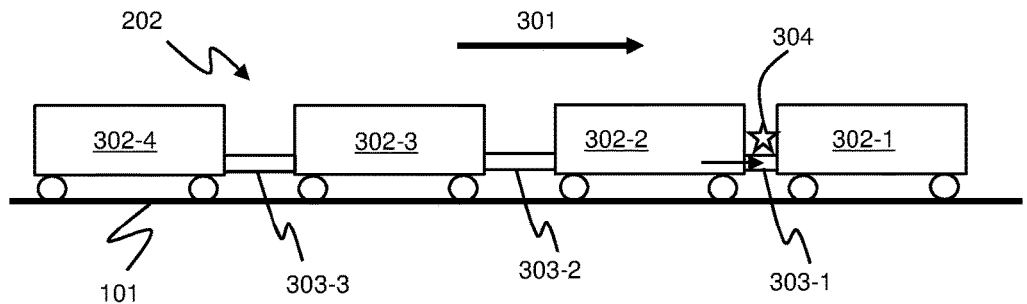
Figure 3C:
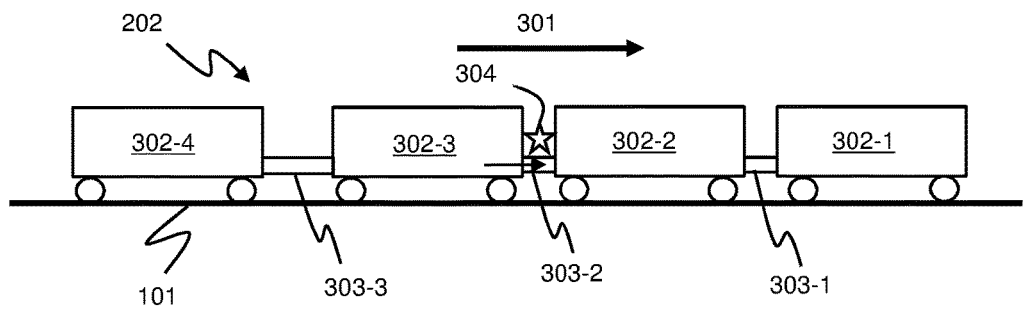

For example consider a train decelerating as illustrated in FIGS. 3a-c. FIG. 3a illustrates a train 202 travelling on a track 101 in the direction illustrated by arrow 301. Four cars 302 of the train are illustrated but it will be appreciated that, in practice, there may be many more cars, whether freight cars of any type or passenger carriages etc. The cars 302 are connected to one another by couplings 303. As will be understand by one skilled in the art many such couplings have at least some flexibility to allow the distance between the cars 302 to vary within certain limits, with buffers or other shock absorbers being provide to reduce the shock of acceleration/deceleration.

FIG. 3a illustrates the train moving at a substantially constant speed. Now consider that the train 202 brakes relatively heavily. As discussed above a braking control signal may propagate from at or near the front of the train towards the rear of the train activating the brakes of each car. Delays in the propagation of the braking signal along the train can result in the rearward cars starting to brake and thus decelerate later than the forward cars. Thus, in this example, the car 302-1 at the front (of the cars shown) may brake and slow down before the other cars 302-2 to 302-4 and thus car 302-2 may temporarily end up travelling faster than car 302-1 in front of it. The distance between these two cars will close, with the shock absorbers, i.e. buffers or the like, of the coupling 303-1 between the relevant cars acting to provide some slowing force to car 302-2. However under relatively heavy braking there may be relatively large forces transmitted through the coupling and once coupling 303-1 reaches its minimum extent the two cars may effectively collide through the coupling as illustrated in FIG. 3b. This could produce an acoustic transient signal 304.

Car 302-2 will thus be slowed and will be travelling slower than the cars 302-3 and 302-4 behind it. Car 302-3 however will still be travelling faster and may thus, in due course, impact with car 302-2 as illustrated in FIG. 3c. This effect may be repeated along the length of the train.

A similar effect may occur under heavy acceleration. A given car may be accelerated forward by traction from the cars in front of it. As that car accelerates the coupling between that car and the car behind it may extend until the coupling reaches maximum extent and the car behind is jolted forward. This will also result in a likely acoustic disturbance.

Under less extreme deceleration or acceleration however the forces applied to the coupling will be lower and thus the amount of any shock applied to the coupling and the amount of any acoustic disturbance, if any, will also be lower.

It has been appreciated that this may result in a series of acoustic transients over time, the locations of which travel backwards throughout the train. Such a sequence of acoustic transients could therefore be seen as a characteristic acoustic signal indicative of relatively large acceleration or deceleration and thus relatively large in-train forces. Surprisingly this characteristic signal indicative as relatively large in-train forces can be identified within the totality of the acoustic signals generated by the train as it moves.

Figure 4:
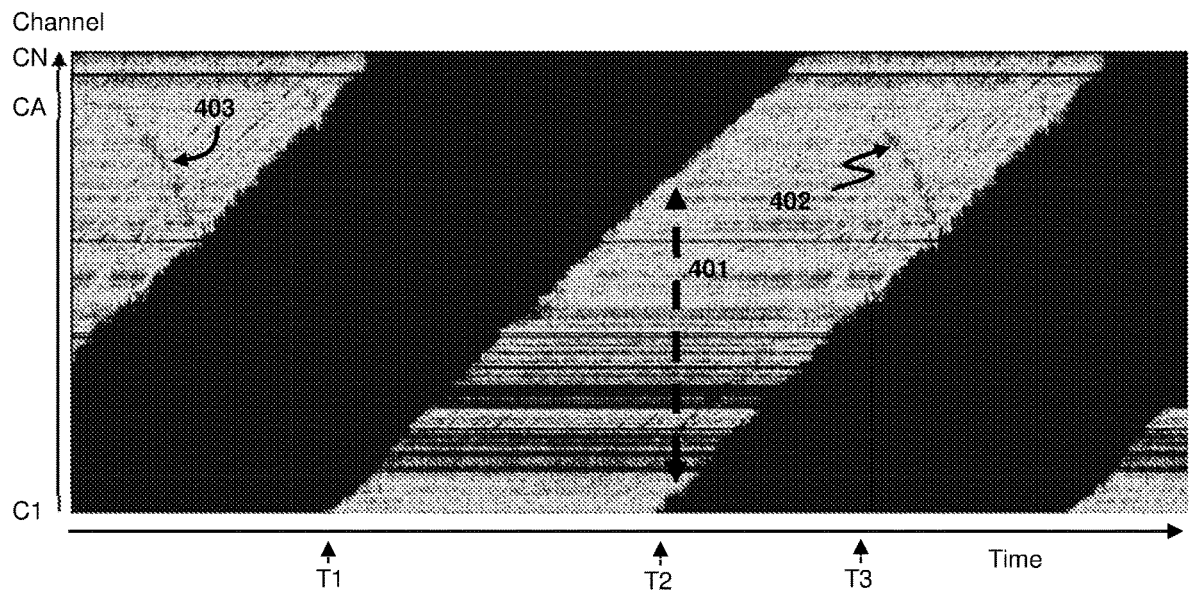
FIG. 4 illustrates example data from a DAS sensor exhibiting a characteristic signature of in-train train forces.

FIG. 4 illustrates a waterfall plot of data generated from a fibre optic distributed acoustic sensor with a sensing fibre deployed along the path of a rail track as a train traveled along the track. The waterfall plot illustrates the acoustic intensity from each channel of the sensing fibre over time, i.e. the intensity of a measurement signal indication acoustic disturbances detected by each sensing portion. In a practical system the acoustic intensity detected is represented by colour—which can't be shown clearly in the black and white representation of FIG. 4. However in general in FIG. 4 a difference in acoustic intensity is indicated by a difference in greyscale intensity.

The channels of the DAS sensor are spaced linearly along the sensing fibre, from a first channel C1 to a last channel CN. The sensing fibre is deployed to run generally along the path of the track and thus generally correspond to distance along the track. As mentioned above a mapping of the channels to the track can be performed to adjust for any deviation in the path of the sensing fibre from the path of the track. In this instance the track was a test ring track of several kilometres in length and the sensing fibre was deployed along the length of the entire ring.

At the start of the time window illustrated in FIG. 4 there is no significant acoustic activity detected at channel C1—as the train is elsewhere on the track. At a time T1 there starts to be increased acoustic activity detected at channel C1 as the train reaches the sensing portion corresponding to channel C1. There is significantly increased acoustic activity detected at this channel until the train has completely passed the relevant sensing portion as a later time T2. It can be seen that the train movement thus results in an acoustic activity profile in the DAS data with a relatively clearly defined start and end that propagates along the channels of the DAS sensor at a rate based on the train speed. The extent of this acoustic activity profile along the sensing fibre, i.e. dimension 401, corresponds to the length of the train, which for this data was of the order of 2 km in length. Such an acoustic activity profile may be used for tracking the movement of trains on a rail network.

Taking the waterfall plot of FIG. 4 as a whole there are various individual acoustic features that can be identified within the general acoustic activity profile due to the train. As mentioned the leading and trailing edges of the continuous acoustic activity in the plot correspond to the front and rear of the train and the gradient of these edges is related to the train speed on the track. Some features within the acoustic activity profile can be identified that appear to track along the channels of the sensor with the same gradient as the leading/trailing edges, suggesting the relevant acoustic source for the detected signals is associated with a particular part of the train itself (and thus moves with the train). Some features in the acoustic activity profile can also be seen associated with a given channel (and thus in this plot appear as horizontal features). Such features could, for instance, indicate a difference in sensitivity at that channel compared to other channels or some element of the track or fixed environment at that location that responds to the train passing in a particular way that differs from that at other locations.

It can also be seen that there is a feature 402 that, in this particular plot, seems to resemble a curve of increased acoustic intensity. This feature can be seen to start at a time around T3 at a certain channel and then apparently propagates, over time, along channels in a direction opposite to the direction of motion of the train. This feature corresponds to an acoustic source or series of acoustic events that begin at a certain position along the train and then move towards that back of the train with a relatively constant rate of progression.

This feature 402 corresponds to a series of acoustic transients starting at a locations of the trains and progressing backwards, as would be expected under heavy braking as described above.

It can also be seen that a similar feature 403 appears in the acoustic profile from the same channels of the sensing fibre from an earlier pass of the train around the test ring. DAS data corresponding to further passes of the train around the test ring all exhibited similar features. In the data for this test the train was a remotely controlled unmanned test train. It can therefore be seen that on each pass of the test ring the train was undergoing relatively high deceleration at this point of the track. This indicated the presence of a specific feature along the track resulting in the necessity for brake application in this direction of travel, for example an incline, sharp corner etc. The resulting sequence of acoustic transients was consistently and reliably detectable in the DAS data.

Figure 5:
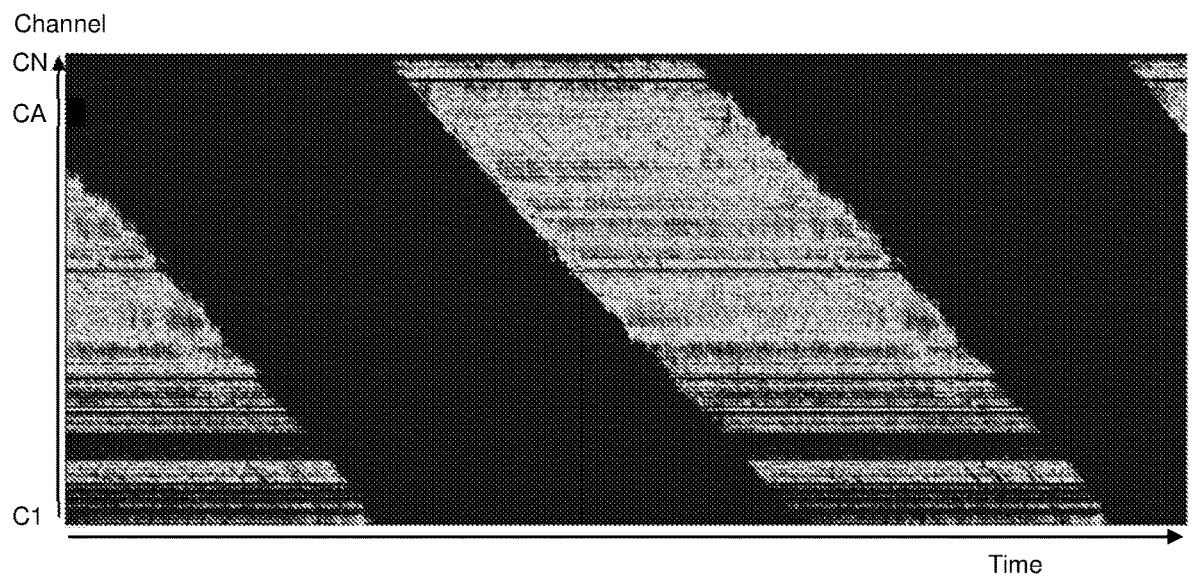
FIG. 5 illustrates a counter-example of data that does exhibit the characteristic signature.

FIG. 5 illustrates a waterfall plot of DAS obtained from the same test track using the same DAS sensor and thus the same arrangement of sensing fibre, whilst the same train was travelling in the opposite direction. No corresponding feature was present in the data obtained whilst the train was travelling in this direction, confirming that the signal is not due to some aspect of the track itself at those sensing channels and is due to movement of the train. When the train was travelling in the opposite direction there was no need for heavy braking at this point of the track.

Figure 6:
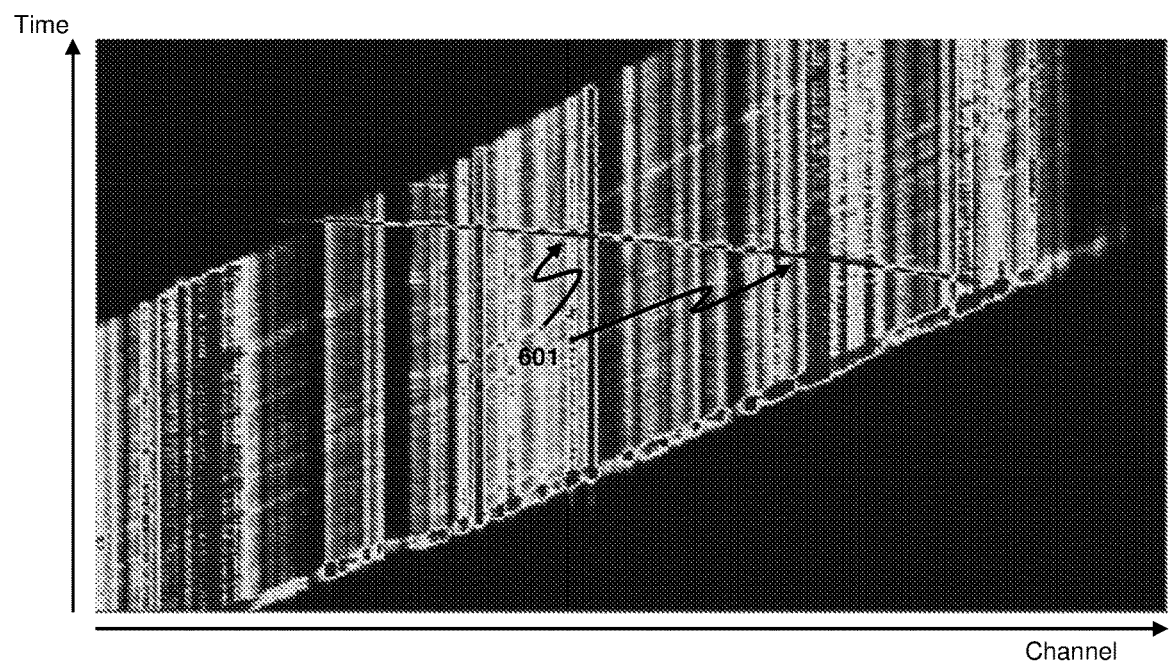
FIG. 6 illustrates another example of data from a DAS sensor exhibiting the characteristic signature.

FIG. 6 illustrates another waterfall plot of acoustic data obtained from a DAS sensor with a sensing fibre deployed along a rail track, in this instance from a DAS sensor deployed along a rail track forming part of an actual rail network. The data illustrated corresponds to movement of a long freight train along a monitored section of track. Note in FIG. 6 the axes are swapped compared to the plots of FIGS. 4 and 5, and thus channel of the DAS sensor is represented on the x-axis. In this plot a strong acoustic feature 601 can be observed that begins near to the front of the train and which propagates rearwards along the whole length of the train.

In embodiments of the invention a processor, e.g. data processor 107, may thus be configured to analyse the measurement signals from a DAS sensor to identify acoustic signals corresponding to passage of a train and to detect a characteristic signature, the characteristic signature being a series of acoustic transients that start at a certain location within the train and that propagate rearwards along the train.

Identification of such a characteristic signature can be used an indication of significant in-train forces, for example relatively large forces due to excessive acceleration or deceleration. In some instance the intensity of the characteristic signature may be indicative of the magnitude of the in-train forces and the processor may generate an estimate the magnitude of the in-train forces. In some embodiments the processor may analyse the characteristic signature to determine information about the propagation of in-train forces through the train.

The data processor may therefore analyse the measurement signals from the DAS sensor to identify the acoustic signals associated with the train. From within the acoustic signals associated with the train transient acoustic signals, of the type described above may be detected, for instance for looking for short time duration acoustic signals within one or more defined frequency bands. The characteristic signature may be detected by analysing whether transients detected in the signals from different channels are clustered in time in a way consistent with in-train forces, for instance be using an appropriate model or models of the progression of in-train forces.

A fitting process may be performed to fit the transients to an appropriate sequence, e.g. a curve in the channel-time plot, for example using polynomial regression. If an appropriate clustered sequence is identified this may be taken as detection of the characteristic signature. The magnitude of the transients over time as the sequence progresses through the train may be determined and/or the speed of propagation along the train may also be detected.

Figure 7:
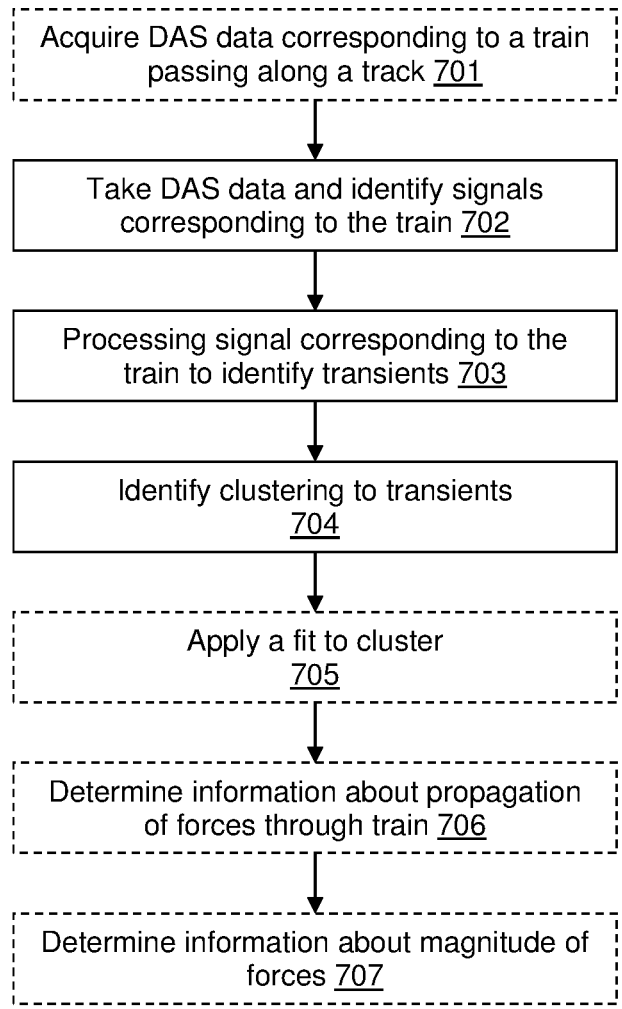
FIG. 7 illustrates a flowchart of a method according to an embodiment.

FIG. 7 illustrates one example of a processing method according to an embodiment.

First DAS sensing of the type described above may be used to monitor the acoustic signals generated by a rail vehicle travelling along a monitored section of track, i.e. a section of track along which a DAS sensing fibre is deployed. Preferably a relatively long length of track may be monitored, for example over the order of several kilometres or more. As mentioned above in some instances DAS sensors may be provided to allow for train tracking and other monitoring purposes and thus DAS sensors may be used at certain key areas of the rail network or substantially all of the rail network in question. In some applications however the DAS sensor may be provided mainly for identifying excessive in-train forces and thus the sensing fibre may be provided only in areas of the track where heavy braking or excessive acceleration may be expected.

It should be noted that whilst the method encompasses performing in DAS sensing to acquire the relevant data the methods also apply to processing data acquired by a suitable DAS sensor. Thus a rail network operator for instance may use DAS sensors to acquire the relevant data for subsequent analysis.

At step 702 the DAS data is analysed to detect acoustic signals corresponding to a train passing. In one example the measurement signals from each channel may be processed in one or more frequency bands in which train signals are expected. For example detecting acoustic signals corresponding to the train may comprise processing the acoustic data in a first frequency band, which may for example be of the order of 200 to 400 Hz, dependent on the particular installation, to identify the start and end of the train in time for each channel. The start and end of the train signal may be identified in a number of ways such as by using Constant False Alarm Rate (CFAR) processing as would be understood by one skilled in the art. The start and end of the train for each channel may also be compared across adjacent or nearly channels for consistency. This provides a time window for the measurement signals from each channel that corresponds to acoustic signals generated by the train passing the relevant sensing portion.

Having identified the signals corresponding to the train the measurement signals in that time window for each channel may be analysed to detect any transients. In some embodiments the signal in at least a second frequency band, which may be different from the first frequency band and which may be higher than the first frequency band may be analysed to detect transients. In some instance transient detection may be applied to multiple different frequency bands higher than the first frequency band. The specific frequency bands used may be configurable dependent on the specific installations properties and conditions.

In general higher frequency bands may be preferred for detecting relatively high amplitude transient. Higher amplitude and shorter duration impulses become more broadband and thus more energy reaches the higher frequencies. At such frequencies there is less masking of the transient due to impulsive events from the general train signal.

However operating in a relatively high frequency band may not allow detection of lower amplitude transients corresponding to lower in-train forces that are still of interest. Thus the processing may be applied in multiple frequency bands. An intermediate frequency band may be used which has a lower cut-off frequency which is high enough such that the transients of interest are not completely masked by the general train noise but low enough in frequency to maximise the likelihood of detecting the smallest in-train force of interest. Processing may also be performed in a higher frequency band, which has a cut-off frequency higher than the intermediate frequency band so as to qualify transient detections made in the intermediate band and/or reduce the effects of masking for the higher amplitude transients.

In general it is expected that as the sequence of transients propagates down the train the magnitude of the forces will increase as the propagation speed increases. The intermediate band may be of use for detecting the initial transients with the higher frequency band being used to detect and/or qualify the later larger amplitude transients.

It will be appreciated however that transients may still be detected in lower frequency bands. For example the waterfall plot shown in FIG. 4 shows data in a relatively low frequency band of the order of 20-60 Hz and the characteristic acoustic signature may be observed. Thus whilst higher frequency bands may be useful some embodiments may apply transient detection to lower frequency bands and/or to multiple different frequency bands, which may overlap, at least partly, with the first frequency band used for detecting the train signal.

Transients may be identified, for example, by using CFAR processing with a short-time signal window and long-time background window with appropriate guard such that short impulses can be identified.

Any identified transients in the channels may then be analysed to determine any clustering of transients that corresponds to the characteristic signature. The transients may therefore be grouped in clusters in space and time with tolerances on what may be clustered based on physical models of propagation of in-train forces.

In some embodiments identification of a suitable cluster of transient corresponding to the first characteristic signal may be taken as an identification of the characteristic signature and hence indicative of an occurrence of significant in-train forces. In some embodiments a flag or alert of some sort may be generated.

In some embodiments, once clustered, a curve fit may be applied to the transients to determine various characteristics of the in-train forces in step 705. For instance in one example a polynomial regression may be applied to the transients and then fit to a model to infer the physical characteristics of the in-train forces. The fit may determine the shape of the characteristic signature in the space-time plot. From this fit various information may be determined. For example information about the propagation of forces through the train may be determined in step 706. This may include the rate of propagation of in-train forces down the train and/or the rate of change of propagation of in-train forces down the train. Additionally or alternatively information about the magnitude of in-train forces may be determined, for example estimates of the magnitude of forces at various parts of the train and/or the rate of increase in magnitude of transients.

The rate of propagation of the in-train force is related to the velocity difference between the colliding cars of the train. An estimate of impact velocity can be inferred by the rate of propagation of the in-train forces, i.e. the rate at which acoustic transients progress along the train. For long trains the rate of propagation of the in-train forces down the train may vary along the length of the train and thus an indication or estimate of impact velocity may be determined at several different locations along the length of the train. Such an indication may itself be used as a measure of the severity of the in-train forces.

Information regarding the in-train forces may be used in variety of different ways.

Detection of occurrence of significant in-train forces may be of interest. This may be used to determine when maintenance or inspection of the couplings of a train may be required. For example inspection may be scheduled following any instance of detection of in-train forces of a certain threshold, e.g. over a threshold of magnitude and/or rate of propagation throughout the train.

Detection of occurrence of large in-train forces may be used to set appropriate controls or guidance for a driver to avoid significant forces in the future. For example if a certain number or types of train consistently experience large in-train forces at a certain part of the track, e.g. due to braking forces, the speed limit approaching that section may be reduced or the driver given guidance about braking earlier and in a more gradual fashion so as to avoid potential damage to the train.

In some instances the detection of occurrence of significant in-train forces may be determined in real time as a train is travelling and information regarding the detection of significant in-train forces communicated to the train via some suitable means for relaying to the driver. This may then be used to alert the driver of the severity of the in-train forces and whether they are exceeding the recommended tolerances for the specific train configuration, allowing the driver to adjust operation of the vehicle accordingly.

In general information about sections of track that lead to trains experiencing significant in-train forces may be useful for future track design or redesign.

Embodiments of the invention thus provide the ability to detect the occurrence of significant in-train occurring due to train acceleration or deceleration by detecting acoustic transients generated at the couplings between train cars under such conditions. This is possible with distributed fibre optic sensing such as DAS as such a sensor has the ability to track acoustic features travelling within the train signal, which requires a spatially distributed system capable of measuring the signal at all points along the train (in this case all couplings along the train). It will be noted that this could not be achieved with a wayside point sensor. The use of DAS avoids the need to instrument every coupling on all the trains on which in-train force monitoring is desired and thus the present method provides a non-invasive method applicable to any train travelling on a monitored section of track.

It should be noted that the above-mentioned embodiments illustrate rather than limit the invention, and that those skilled in the art will be able to design many alternative embodiments without departing from the scope of the appended claims. Features from various embodiments may be combined and used together except where expressly indicated otherwise. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of detecting in-train forces comprising:
taking a first data set corresponding to measurement signals from a plurality of channels of at least one fibre optic distributed acoustic sensor having a sensing fibre deployed to monitor at least part of a rail track, wherein the first data set corresponds to measurement signals acquired as a train passed along the rail track; and
analysing said measurement signals to detect a first characteristic signature, said first characteristic signature comprising a sequence of acoustic transients that appear to propagate rearwards along the train.

2. A method as claimed in claim 1 wherein an occurrence of the first characteristics signature is identified as occurrence of significant in-train forces.

3. A method as claimed in claim 1 comprising estimating the magnitude of the in-train forces based on the intensity of the acoustic transients.

4. A method as claimed in claim 3 comprising determining the rate of change of magnitude of the in-train forces as they propagate through the train.

5. A method as claimed in claim 1 comprising analysing the sequence of acoustic transients to determine information about the propagation of in-train forces throughout the train.

6. A method as claimed in claim 5 comprising determining an estimate of impact velocity between cars of the trains at at least one location along the train.

7. A method as claimed in claim 1 wherein analysing the measurement signals comprises identifying acoustic signals associated with the train for each of a plurality of channels.

8. A method as claimed in claim 7 wherein identifying acoustic signals associated with the train comprises processing the signals in a first frequency band.

9. A method as claimed in claim 7 wherein the method comprises analysing the acoustic signals associated with the train to detect transients.

10. A method as claimed in claim 9 wherein analysing the acoustic signals associated with the train to detect transients comprises analysing the acoustic signals in at least one defined frequency band.

11. A method as claimed in claim 10 when dependent, directly or indirectly on claim 7, wherein said at least one defined frequency band has a cut-off frequency that is higher than that of the first frequency band.

12. A method as claimed in claim 11 wherein the analysing the acoustic signals associated with the train to detect transients comprises analysing the acoustic signals in at least a second frequency band and a third frequency band, wherein the third frequency band has a lower frequency cut-off that is higher than the second frequency band.

13. A method as claimed in claim 12 wherein the method comprises identifying a transient in the second frequency band and qualifying the transient in the third frequency band.

14. A method as claimed in claim 9 wherein detecting the first characteristic signature comprises determining the presence of any clustering of transients that corresponds to the characteristic signature.

15. A method as claimed in claim 14 wherein the transients are grouped in clusters in space and time within predetermined tolerances based on a model of in-train forces.

16. A method as claimed in claim 14 comprising applying a curve fit to the cluster.

17. A method as claimed in claim 1 comprising performing distributed acoustic sensing on the sensing fibre as a train travels on the rail track to generate the first data set.

18. A method as claimed in claim 17 comprising communicating any detection of the first characteristic signature to the train.

19. A method as claimed in claim 17 comprising, on detection of the first characteristic signature, performing at least one of: generating an alert for the train driver and automatically adjusting one aspect of the train movement control.

20. An apparatus for detecting in-train forces comprising:
a processor configured to:
take a first data set corresponding to measurement signals from a plurality of channels of at least one fibre optic distributed acoustic sensor having a sensing fibre deployed to monitor at least part of a rail track, wherein the first data set corresponds to measurement signals acquired as a train passed along the rail track; and
analyse said measurement signals to detect a first characteristic signature, said first characteristic signature comprising a sequence of acoustic transients that appear to propagate rearwards along the train.

21. A rail monitoring system comprising:
a sensing optical fibre deployed to run along at least partly along the path of a rail track;
an interrogator unit configured to perform distributed acoustic sensing on the sensing optical fibre to generate measurement signals from a plurality of channels of the sensing optical fibre; and
an apparatus for detecting in-train forces as claimed in claim 20 configured to operate on a first data set of measurement signals acquired by said interrogator unit as a train passed along the rail track.

* * * * *